A. ABEL.
Barber's Chair.
No. 8,320. Reissued July 9, 1878.
Fig. I.
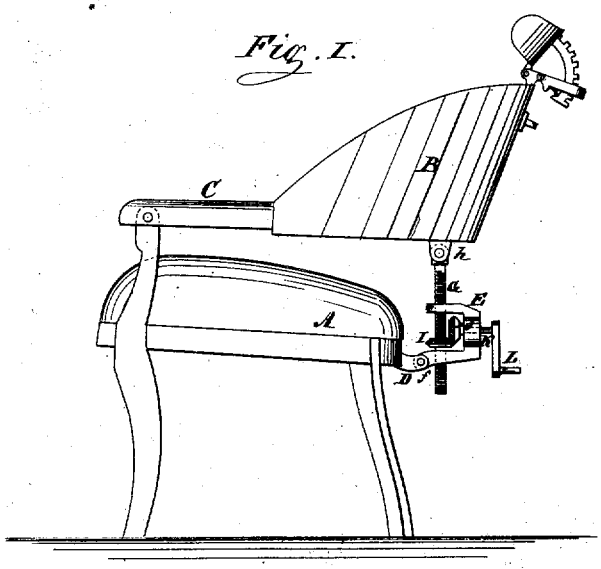
Fig. II.
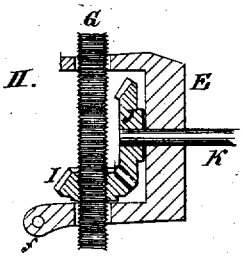
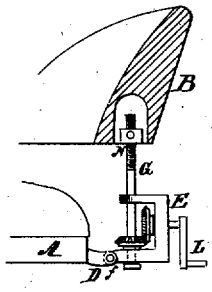
Fig. III.
Witnesses.
Earle A. Smith
Abram H. Van Blarcom
Inventor.
A. Abel
per Henry E. Roeder
Attorney.
N. PETERS, PHOTO-LITHOGRAPHER, WASHINGTON, D. C.

UNITED STATES PATENT OFFICE.

ANTHONY ABEL, OF NEW YORK, N. Y.

IMPROVEMENT IN BARBERS' CHAIRS.

Specification forming part of Letters Patent No. 124,713, dated March 19, 1872; Reissue No. 8,320, dated July 9, 1878; application filed June 10, 1878.

*To all whom it may concern:*

Be it known that I, ANTHONY ABEL, of the city of New York, in the State of New York, have invented a new and useful Improvement in Barbers' Chairs, of which the following is a specification:

This invention relates to the construction of chairs with adjustable backs for barbers' use, having special reference to the raising and lowering the back of the chair; and it consists in a screw and nut connected with the bottom and back of the chair by joint-connections, and operated by bevel-gear wheels supported in a yoke, and arranged as hereinafter described.

In the accompanying drawing, Figure I represents a side elevation of the chair. Fig. II represents the operating mechanism on a larger scale, detached; and Fig. III is a modification.

Similar letters of reference indicate corresponding parts.

A is the bottom of the chair. B is the back. C represents the arms of the chair-back, which are pivoted to the tops of the front legs or posts, to allow the back to rise and fall. D is an arm, which is securely fastened to the bottom of the chair. E is a yoke, which is pivoted to the arm D, as seen at *f*. G is the screw which passes through the arm of the yoke to raise and lower the back of the chair.

In this example of my invention I attach the upper end of the screw to the chair-back by a pivot-connection at *h*, and use one of the bead-wheels I as a nut on the screw. This bead-wheel I is revolved thereon by another bead-wheel, J, on the end of the crank-shaft K. L is the crank.

It will be seen that as the nut I is revolved the screw will be raised or lowered, as the bottom side or collar of the nut-wheel I rests upon the arm of the yoke.

As the back of the chair is raised or lowered the relative position of the screw thereto will change; but as the screw is pivoted at its top end to the back, or is allowed to turn and pass through the hinged yoke, the parts work easily together, and without undue friction.

Having thus described my invention, I claim as new and desire to secure by Letters Patent—

1. In combination with the back B and bottom A of the chair, a screw, G, and suitable nut, connected by joint-connections thereto, substantially as and for the purpose described.

2. In combination with the bottom A and back B of a chair, the screw G, bead-wheels I and J, yoke E, shaft K, and crank L, arranged to operate substantially as and for the purposes described.

ANTHONY ABEL.

Witnesses:

HENRY E. ROEDER,
J. B. NONES.